(12) United States Patent
Porter

(10) Patent No.: US 8,813,774 B1
(45) Date of Patent: Aug. 26, 2014

(54) METHOD FOR SEALING A DRAIN

(76) Inventor: Jay K. Porter, Missouri City, TX (US)

( * ) Notice: Subject to any disclaimer, the term of this patent is extended or adjusted under 35 U.S.C. 154(b) by 177 days.

(21) Appl. No.: 13/438,835

(22) Filed: Apr. 3, 2012

(51) Int. Cl.
*F16K 13/10* (2006.01)

(52) U.S. Cl.
USPC .................. 137/251.1; 137/247

(58) Field of Classification Search
CPC ................... E03C 1/28; E03C 1/281
USPC .......... 137/247.11, 247.41, 251.1, 247
See application file for complete search history.

(56) References Cited

U.S. PATENT DOCUMENTS 4,326,981 A * 4/1982 Molina .................. 252/301.19
7,183,239 B2 * 2/2007 Smith et al. ................ 507/90
8,099,997 B2 * 1/2012 Curr et al. ................. 73/49.5

FOREIGN PATENT DOCUMENTS

WO    WO 2010001595 A1 * 1/2010

* cited by examiner

*Primary Examiner* — John Rivell
*Assistant Examiner* — Angelisa Hicks
(74) *Attorney, Agent, or Firm* — Karen B. Tripp

(57) ABSTRACT

A method for sealing a drain by pouring a chemical sealant comprising ethylene oxide/propylene oxide block co-polymer into the drain trap in a sufficient quantity to displace any existing fluid in the drain with the sealant and allowing the sealant to remain in the drain trap. The sealant will not evaporate (significantly if at all), and will provide a seal, for a period of at least twelve months. The sealant may be removed and the drain opened by flushing with water.

17 Claims, 1 Drawing Sheet

"Stinky Drain Solution™" Filled

METHOD FOR SEALING A DRAIN

BACKGROUND OF THE INVENTION

1. Field of the Invention

The present invention relates to compositions and non-mechanical methods for preventing dry drains and consequent problems associated therewith. The invention is particularly advantageous for sealing drains that are left dormant for several months.

2. Description of Relevant Art

Essentially all plumbing fixtures including sinks, bathtubs, toilets, and floor drains must be equipped with either an internal or external trap. A trap is an integral component of a fixture's drainpipe and is designed to retain an appropriate amount of fluid such as water after the greater portion of the fluid has been evacuated from the fixture. The fluid evacuated from a fixture flows through the fixture's drainpipe and trap and subsequently enters a comprehensive drainage system. The comprehensive drainage system is comprised of a series of linked pipes that eventually and most often terminate in a locale where potable water or sewage is processed. The drainage system commences and therefore is open at one or more fixtures. Because pipes are never filled to capacity by the fluids that are being evacuated, all drainage systems have a gaseous atmosphere that can be toxic and at the very least, noxious; simultaneously, the atmosphere inside the drainage system can support living organisms and their procreation. However, as noted above, in close proximity to each fixture there is a trap that is an integral part of the fixture's dedicated drainpipe that in turn is connected to a comprehensive drainage system. By design, the fluid that fills a trap serves as a barricade that will not allow noxious gases and living organisms to pass from the comprehensive drainage system into a fixture through its drain opening to become a nuisance in the structure that is accommodated by the fixture.

Most if not all of the fluids that might commonly fill a trap, namely and most commonly water, will evaporate within weeks if the drain is not used so that the fluids are replenished. Once the fluid has evaporated and the upper portion of the trap becomes exposed, noxious gases and living organisms will be able to pass from the comprehensive drainage system into a fixture through the drain opening and then potentially negatively impact the health and wellbeing of those who will occupy the structure that is accommodated by the fixture.

Sealants have been proposed for introduction into drain traps to prevent evaporation of fluids in the traps. Japanese Patent Application Publication No. 2009-127355, of Igarashi Taakao et al, published Jun. 11, 2009, and United States Patent Application Publication No. 2011/0162720 A1, of Ueno, published Jul. 7, 2011, provide examples of such sealants. FIG. 2 generally depicts the principals of such prior art. These sealants, as illustrated in FIG. 2, comprise water 22, oil 20 and a surfactant 24 and are generally believed to create an emulsion 26 to lay on top of the water 22 or other fluid already in the trap 32, particularly water 22 in the drain trap 32 on the fixture side 36 of the trap. The oil 20 in the emulsion 26 prevents evaporation of the water 22 immediately beneath the emulsion 26. A problem with such sealants, however, is that the emulsion does not typically also extend to the top 28 of the fluid on the other side 30 of the trap 32, leaving the fluid in the trap 32 vulnerable to evaporation from that side 30. Efforts to substitute oil 20 for water 22 in the trap 32 has the consequence of being difficult to flush when the drain 34 is ultimately used, resulting in clogging of the drain 34. Mechanical sealants have also been proposed, but these are cumbersome to use.

A need continues to exist for improved methods and products to temporarily seal drains to be left dormant for a number of months.

SUMMARY OF THE INVENTION

The present invention provides a method for sealing a drain with a chemical sealant. In the method, the sealant, comprising ethylene oxide/propylene oxide block co-polymer, is poured into the drain trap in an amount sufficient to displace any preexisting fluids in the trap. The sealant is then allowed to remain in the trap for the period of time that sealing of the drain is desired. The sealant is effective at sealing the drain, and preventing noxious fumes and living organisms from entering the drain through the trap, for at least six to twelve months or more. The sealant may be removed by flushing the drain trap with water. Such flush water quickly mixes with and possibly emulsifies the sealant so that the sealant flushes readily with the water to easily effect removal of the sealant when desired.

DETAILED DESCRIPTION OF PREFERRED EMBODIMENTS

Figure 1:
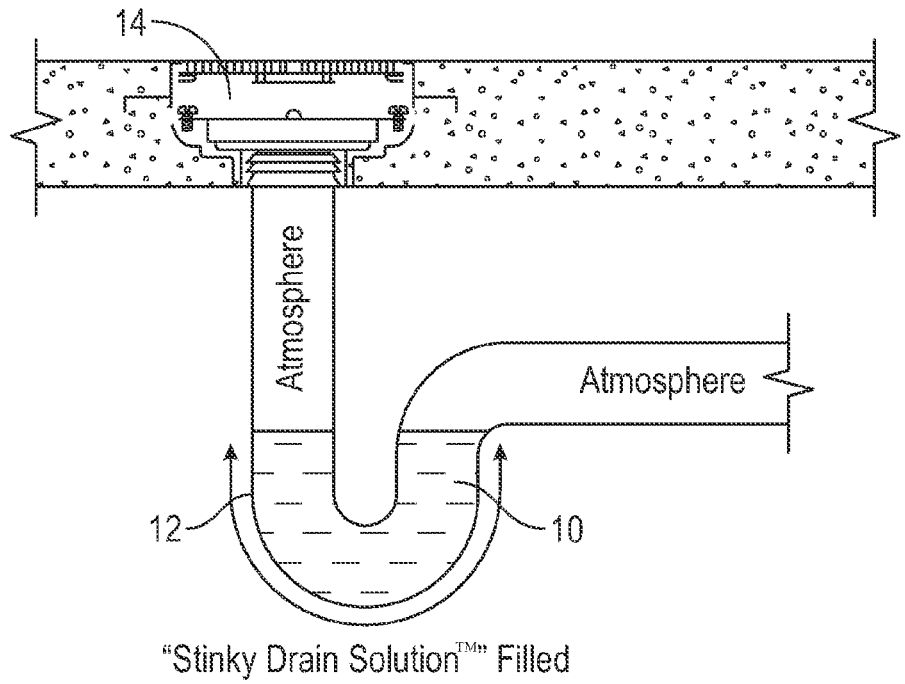
FIG. 1 is a diagram showing a drain system sealed according to the method of the present invention.
Figure 2:
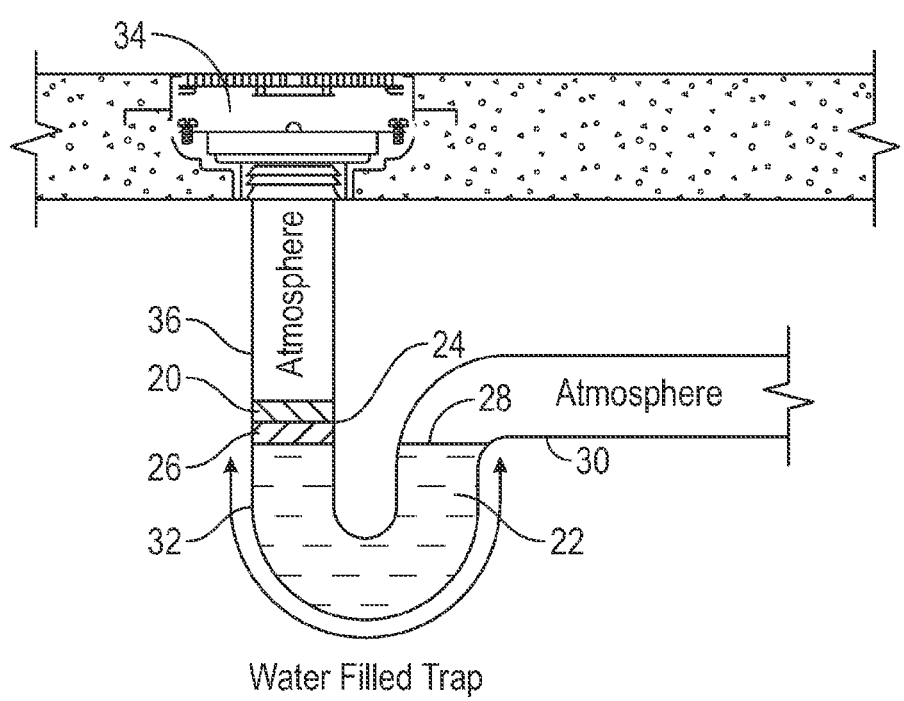
FIG. 2 is a diagram showing a drain system employing a prior art emulsion product as a sealant.

As shown in FIG. 1, the method of the present invention positions a chemical sealant 10 in a drain trap 12 to seal the drain and prevent passage of noxious fumes or living organisms from traveling though the trap and into a fixture comprising the drain 14, such as a sink, toilet, floor drain and the like. The sealant fills the drain trap to effect the seal, a seal that most preferably will allow no leakage. The seal thus will block noxious fumes, such as, for example, sewer gases, from entering the drain 14 through the drain trap 12 and also will block living organisms, such as, for example, cockroaches, from entering the drain 14 through the drain trap 12.

When the chemical sealant 10 is poured into the fixture's drain trap 12, according to the method of the invention, the sealant 10 will displace any water or other fluid lodged in the trap. The chemical sealant 10 is not necessarily heavier than water although it may be heavier than water. Rather, the inertia of movement associated with the pouring of the chemical sealant 10 into the drain's trap 12 drives out trapped water.

The chemical sealant used in the method of the invention most preferably comprises ethylene oxide/propylene oxide block co-polymer in sufficient quantity to displace any preexisting fluids in the trap. This co-polymer comprises repeating units of a central hydrophobic polypropylene oxide unit edged by two hydrophilic polyethylene oxide units. Overall, the co-polymer preferably has a molecular weight of about 2000. In one embodiment, the co-polymer comprises about 10% polyethylene oxide and the polyethylene oxide units together have a molecular weight of about 1800. The sealant preferably does not contain any mineral oil or vegetable oil. The sealant typically has a viscosity similar to that of water. In one embodiment, the sealant further comprises a pesticide. Such pesticide should not change the characteristics of the sealant, and most particularly, the pesticide should be non-caustic, nonvolatile, biodegradable, nonflammable, and soluble/miscible in water. A commercially available chemical sealant particularly suited for use in the invention is "STINKY DRAIN SOLUTION™" available from Environmental Controls Incorporated in Stafford, Tex., U.S.A. This sealant is not a drain cleaner and it does not easily or readily evaporate. Rather, this sealant shows little if any evaporation over a period of 12 months or more.

The chemical sealant used in the method of the invention should be non-caustic, nonvolatile, biodegradable, nonflammable, and soluble/miscible in water. It can provide a no-leak seal in the drain trap for 12 consecutive months or more and still be easily removable to open the drain at any time by flushing the drain with water. It is believed that the sealant, when flushed with water, mixes with the flush water and may even emulsify in the water, for smooth and rapid removal of the sealant, as it is flushed out of the drain.

The foregoing description of the invention is intended to be a description of preferred embodiments. Various changes in the details of the described method and fluids used therein can be made without departing from the intended scope of this invention as defined by the appended claims.

What is claimed is:

1. A method for sealing a drain having a drain trap and optional preexisting fluids in the trap, the method comprising:
   introducing into the trap a chemical sealant heavier than water comprising ethylene oxide/propylene oxide block co-polymer in sufficient quantity to displace all preexisting fluids in the trap;
   displacing any preexisting fluids in the trap with the chemical sealant; and
   allowing the sealant to remain in the trap.

2. The method of claim 1 wherein the co-polymer comprises repeating units of a central hydrophobic polypropylene oxide unit edged by two hydrophilic polyethylene oxide units.

3. The method of claim 1 wherein the co-polymer has an overall molecular weight of about 2000.

4. The method of claim 1 wherein the co-polymer comprises about 10% polyethylene oxide having a molecular weight of about 1800.

5. The method of claim 1 wherein the sealant is non-caustic, nonvolatile, biodegradable, nonflammable, and soluble/miscible in water.

6. The method of claim 1 wherein the sealant forms a no-leak seal in the drain trap.

7. The method of claim 1 wherein the sealant is flushable with water.

8. The method of claim 7 wherein the sealant is removed to open the drain through emulsification with initial flush water.

9. The method of claim 1 wherein the sealant is not a drain cleaner.

10. The method of claim 1 wherein the sealant is effective at sealing the drain trap for at least six months.

11. The method of claim 1 wherein the sealant is effective at sealing the drain trap for at least twelve months.

12. The method of claim 1 wherein the sealant does not evaporate for at least twelve months.

13. The method of claim 1 wherein the sealant will block noxious fumes from entering the drain through the drain trap.

14. The method of claim 1 wherein the sealant will block living organisms from entering the drain through the drain trap.

15. The method of claim 1 wherein the sealant does not comprise a mineral oil or a vegetable oil.

16. The method of claim 1 wherein the sealant has a viscosity similar to that of water.

17. The method of claim 1 wherein the sealant further comprises a pesticide.

\* \* \* \* \*